July 27, 1965     A. ANGIOLETTI ETAL     3,197,358
METAL RUBBER COMPOSITE SEALING PLATE Filed Aug. 2, 1962     2 Sheets-Sheet 1

United States Patent Office 3,197,358
Patented July 27, 1965

3,197,358
METAL RUBBER COMPOSITE SEALING PLATE
Attilio Angioletti, Milan, Italy, and Bernard Wetzel, Arbon, Switzerland, assignors to Società Applicazioni Gomma Antivibranti, "S.A.G.A.," S.p.A., Milan, Italy
Filed Aug. 2, 1962, Ser. No. 214,309
Claims priority, application Italy, Oct. 26, 1961, 19,291/61
1 Claim. (Cl. 161—116)

This invention relates to metal-rubber composite sealing plates.

Metal-rubber sealing plates are known, which comprise a continuous or foraminated metal sheet having on one face at least a rubber layer firmly bonded to the sheet by vulcanization, of uniform or approximately uniform thickness.

Such seals are objectionable in that they are sensitive to tangential stresses also, which superpose on the other stresses exerted thereon by effect of compression from the tightly-sealed parts.

Such tangential stresses result in a deformation of the uniform-thickness rubber layer in planes parallel with the middle plane of the plate and can quickly lead to loosening of the rubber from the metal, thereby adversely affecting the specific function of the seal.

This invention provides a metal-rubber sealing plate in which the sealing properties are improved over known seals and compression on the rubber during clamping of the plate between the parts to be tightly sealed does not particularly result in tangential stresses between the metal and rubber.

A further object of this invention is to provide a metal-rubber sealing plate which is cheaper than known seals through the use of a smaller rubber quantity.

In order to fulfill the above and further objects which will be understood from the appended description this invention provides a composite sealing plate of metal and rubber, having the characteristic feature that one face at least of a continuous (imperforate) metal sheet has firmly bonded thereto a layer of rubber in which outwardly flaring pyramidal recesses are formed of a depth equalling at least eight tenths of the thickness of the layer, the base contour of each recess being situated on an enveloping surface extending parallel with the interface metal-rubber and being formed by crest line sections which provides a crest line section for the base contour of an adjacent recess.

Further characteristic features and advantages of this invention will be understood from the appended detailed description with reference to the accompanying drawings given by way of a non-limiting example, wherein.

Figure 1:
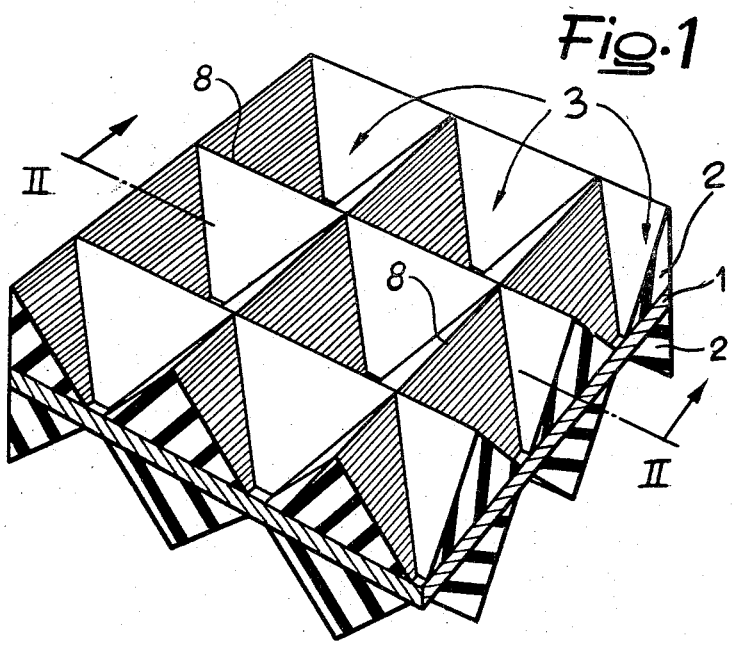
FIG. 1 is a perspective view of a portion of a sealing plate according to this invention.
Figure 2:
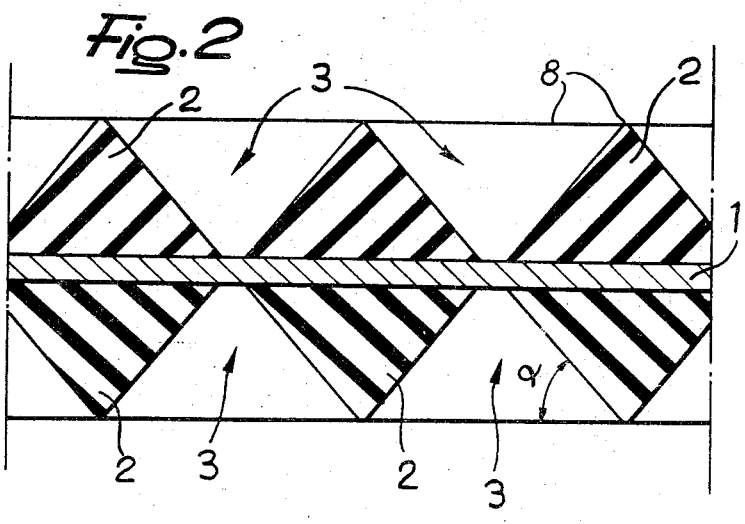
FIG. 2 is a sectional view of FIG. 1 on line II—II.

Reference 1 denotes a metal sheet having flat smooth faces parallel with each others, each of which has firmly bonded thereto a planar layer 2 of a rubber or similar elastomer.

The exposed face of each of the layers 2 consists of a multiplicity of contiguous recesses 3 in the form of truncated pyramids having a square-shaped cross section, the small ends of which are turned towards the metal sheet 1.

The large ends of the recesses 3 have their contour situated on a planar surface extending parallel with the contact surface of the sheet 1 and layer 2, formed by knife-edge line sections 8 each of which simultaneously provides a line section of the base contour of an adjacent recess.

With such structure the peripheries of the large ends of the recesses 3 form on the flat surface enveloping them a square-mesh raster.

The small ends of the recesses 3 abut the face of the metal sheet 1, which is left exposed at the said small ends.

The inclination $\alpha$ of the lateral faces of the truncated pyramids forming the recesses 3 to the plane of the large end conveniently ranges between 35° and 55°, said inclination being preferably of 40°.

Figure 3:
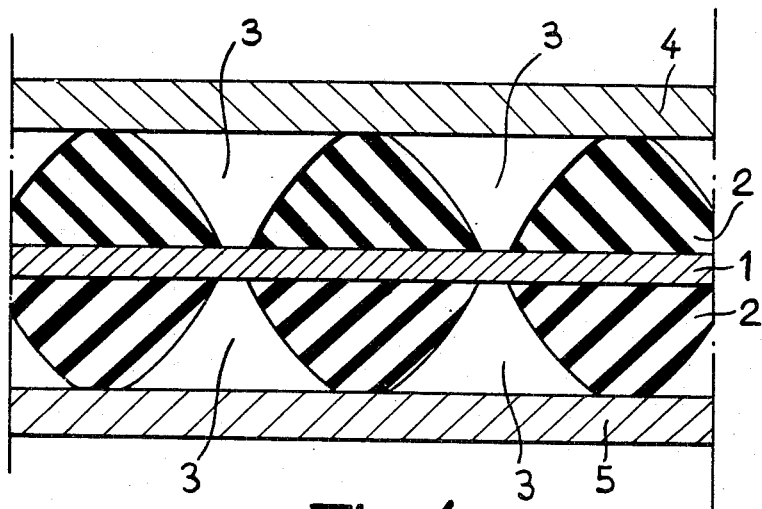
FIG. 3 is similar to FIG. 2 and shows the sealing plate clamped between two rigid members which should be sealingly interconnected.

In actual use the sealing plate is clamped between two members 4, 5, to be sealingly interconnected, as shown in FIG. 3, in which it is assumed that a plate according to this invention is clamped between a cover and the edge of a container.

The contact between the large end edges of the truncated pyramids and surfaces of the members 4 and 5 is initially linear and on crushing of the elastomer material by effect of the clamping pressure goes-over to a surface contact along strips of a limited width.

This configuration affords seals in which, at a given clamping effort of the cover 4 against the edge 5, the specific pressures along the contact surfaces are relatively high and extremely effective in the arrangement herein contemplated.

The recesses 3 closed by the members 4 and 5 form cells in each of which any leakage fluid loses its speed acquired on flowing through the contact strips between the plates 2 and members 4 and 5.

The cells are in fact each constituted by a relatively large space separate from the contiguous cells by contact strips between the rubber and members 4 and 5, through which leakage fluid is laminated and undergoes a loss in pressure resulting in a reduction in velocity during flow to the contiguous cell.

This explains how it becomes possible to reduce to very low values or actually annul outward leakage of fluid, which is wholly inhibited when the inherent pressure of the fluid has sunk over successive cells to a value such that it cannot any longer overcome the pressure prevailing along the contact strips.

It will be clear from the above that clamping pressure of the members to be sealingly interconnected, which deforms the rubber and reduces the cell volume, should not exceed a limit preventing the cells from fulfilling their function of reducing the leakage velocity of the fluid.

At the limit if in the sealing plate according to this invention all the cells were completely annulled due to excessive clamping of the members 4 and 5, the sealing plate would behave like a conventional seal with a uniform rubber layer, with all its inherent disadvantages.

Outside this limit case, deformation of the rubber by effect of clamping of the members 4 and 5 becomes mainly apparent at the zone of the recesses which are farthest from the contact surface with the metal sheet 1, so that tangential stresses over said contact surface are actually nil.

In actual practice it is not always possible to provide seals in which the individual recesses reach by their small ends or apices far enough to touch the metal sheet 1.

In manufacturing the plate a rubber film may in fact be left in contact with the metal at the bottom of the recesses, so that the metal is covered at these regions too.

Under such conditions the rubber film should not exceed in thickness 20% of the thickness of the rubber layer; considering the moderate thickness of rubber layers currently adopted, this value may be considered to be included within conventional allowances in moulding operations.

Figure 4:
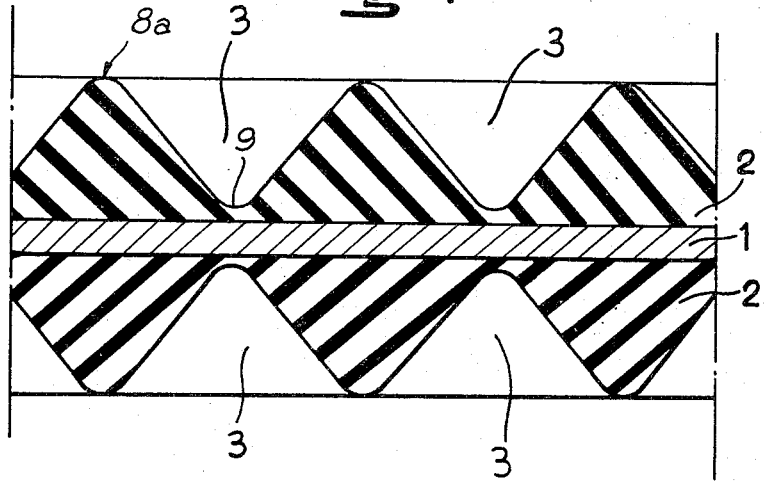
FIG. 4 is a sectional view similar to FIG. 2 of a modified sealing plate.

FIG. 4 shows a modification of this invention, according to which the edges 8a at the large bases of the pyramids are appreciably rounded; FIG. 4 further shows the rubber film 9 which has been left in contact with the metal sheet 1 at the bottoms of the recesses 3.

The cross section of the recesses 3 may be of a shape other than regular polygons shown in the examples; for instance, recesses can be employed of which the cross sectional contour is in the form of irregular polygons having either rectilinear or curvilinear sides.

The drawings show by way of example sealing plates for use between parts having planar surfaces, in which the metal sheet 1 has planar parallel faces. When sealingly interconnecting parts having non-planar surfaces, sealing plates according to this invention can comprise a sheet metal having parallel non-planar surfaces.

What we claim is:

A composite sealing plate comprising a metal sheet, rubber layers firmly bonded to both faces of said metal sheet respectively, each of said rubber layers constituting of a multiplicity of adjacent recesses of pyramidal form, the base contour of each of said recesses having a closed perimeter and being situated on an enveloping surface equidistant from the metal-rubber interface and being formed by intersecting crest line sections each of which provides a crest line section for the base contour of an adjacent recess.

References Cited by the Examiner

UNITED STATES PATENTS

| 2,052,984 | 9/36 | Madison | 189—34 |
| 2,810,671 | 10/57 | Taylor | 161—123 X |
| 3,068,956 | 12/62 | Cooley | 161—116 X |
| 3,086,899 | 4/63 | Smith et al. | 161—131 X |

FOREIGN PATENTS 6,231    1884    Great Britain.

ALEXANDER WYMAN, *Primary Examiner.*

MORRIS SUSSMAN, *Examiner.*